United States Patent [19]

Ezaki

[11] 4,072,075
[45] Feb. 7, 1978

[54] CAKE CUTTER

[76] Inventor: Norio Ezaki, 3-29, Kohamahonmachi, Sumiyoshi, Osaka, Japan

[21] Appl. No.: 681,223

[22] Filed: Apr. 28, 1976

[51] Int. Cl.² .................... B26D 7/06; B26D 3/24
[52] U.S. Cl. ........................... 83/153; 83/651.1; 83/752; 83/773; 83/431; 83/435.1
[58] Field of Search .............. 83/651.1, 752, 773, 83/781, 151, 153, 431; 269/53

[56] References Cited

U.S. PATENT DOCUMENTS

| | | | |
|---|---|---|---|
| 828,105 | 8/1906 | Gillespie | 269/53 X |
| 1,657,483 | 1/1928 | Rabin | 83/651.1 X |
| 2,692,430 | 10/1954 | Kraft et al. | 83/651.1 X |
| 2,792,033 | 5/1957 | Bradley | 83/752 X |

Primary Examiner—Willie G. Abercrombie
Attorney, Agent, or Firm—George H. Mitchell, Jr.

[57] ABSTRACT

Apparatus for cutting a circular cake into a number of equal, segmental pieces consists of a series of superposed horizontal band cutters arranged to intersect a central axis at equal horizontal angles, the cutters being arranged over a vertically movable, cake-supporting table, which is provided with grooves, which are in alignment with the cutters so that when the table is raised, the cutters subdivide the cake into equal pieces and then sink down into the grooves in the table to permit the cake to be removed from the table by a scoop or the like.

8 Claims, 7 Drawing Figures

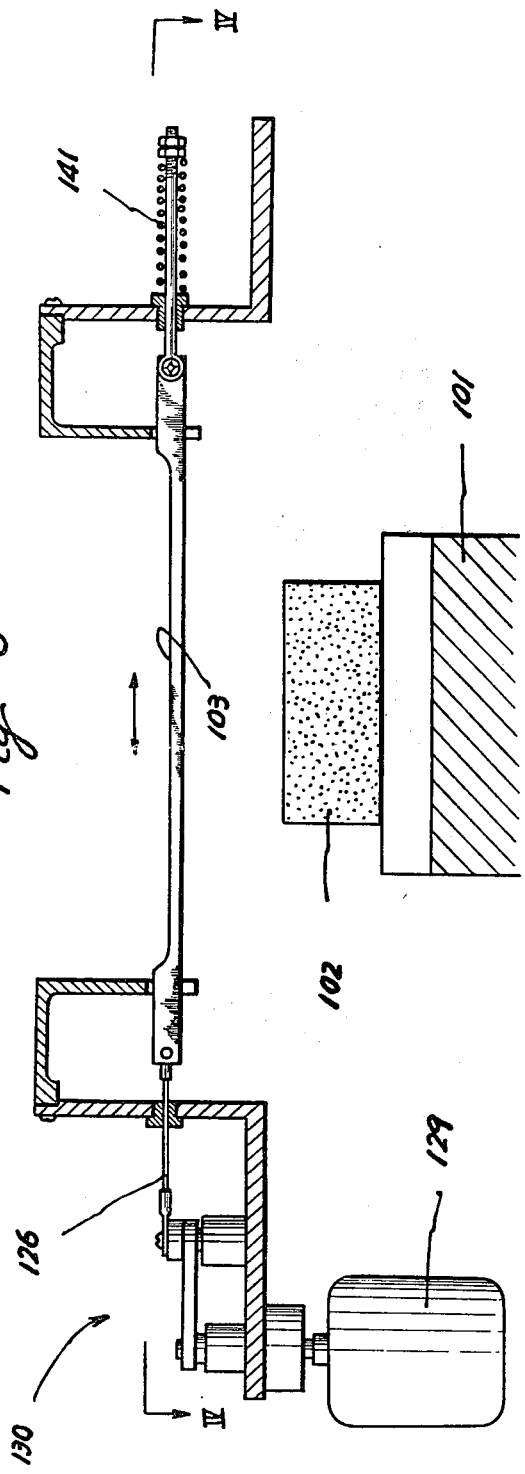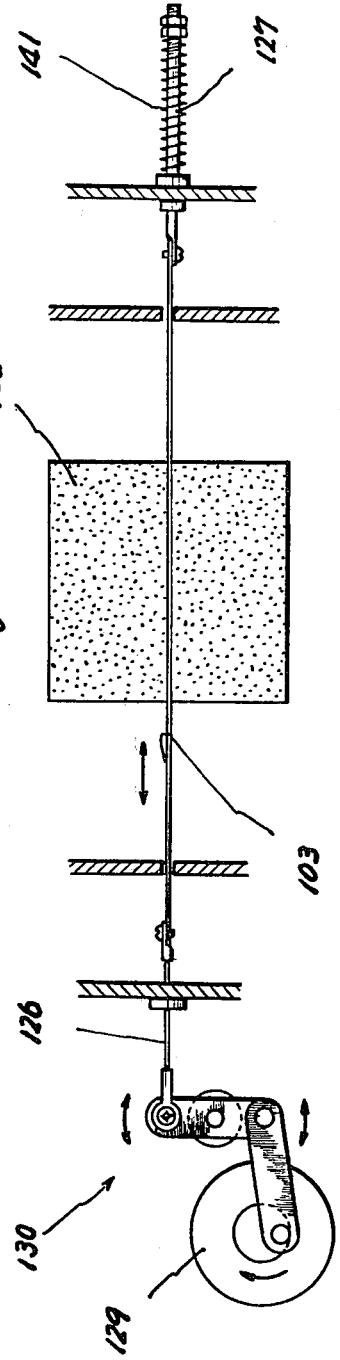

CAKE CUTTER

The present invention relates to an apparatus for cutting cake, for example, for dividing up circular cakes into pieces of equal sized, wedge-shaped pieces used for making sandwiches with various fruits and other fillers between several layers of cake.

Previously known devices have not been capable of setting the cutters to divide cakes into equal parts accurately or were so poorly constructed that they could not maintain any degree of accuracy.

Thus, it is an object of the present invention to provide a cake cutting apparatus which is sufficiently rugged to maintain its operation for long periods of time without breaking down.

It is another object of the present invention to provide a cake cutting apparatus which can divide circular pieces of cake into equal segments accurately and easily.

It is a further object of the present invention to provide a cake cutting apparatus which is simple in construction.

Other objects and advantages of the invention will become obvious after reading the following specification in connection with the annexed drawings in which FIG. 1 is a side elevation of a preferred form of cake cutting apparatus according to the invention;

FIG. 6 is a side view of another form of cutter mechanism, and;

FIG. 7 is a sectional view taken on line IV—IV of FIG. 6.

Figure 1:
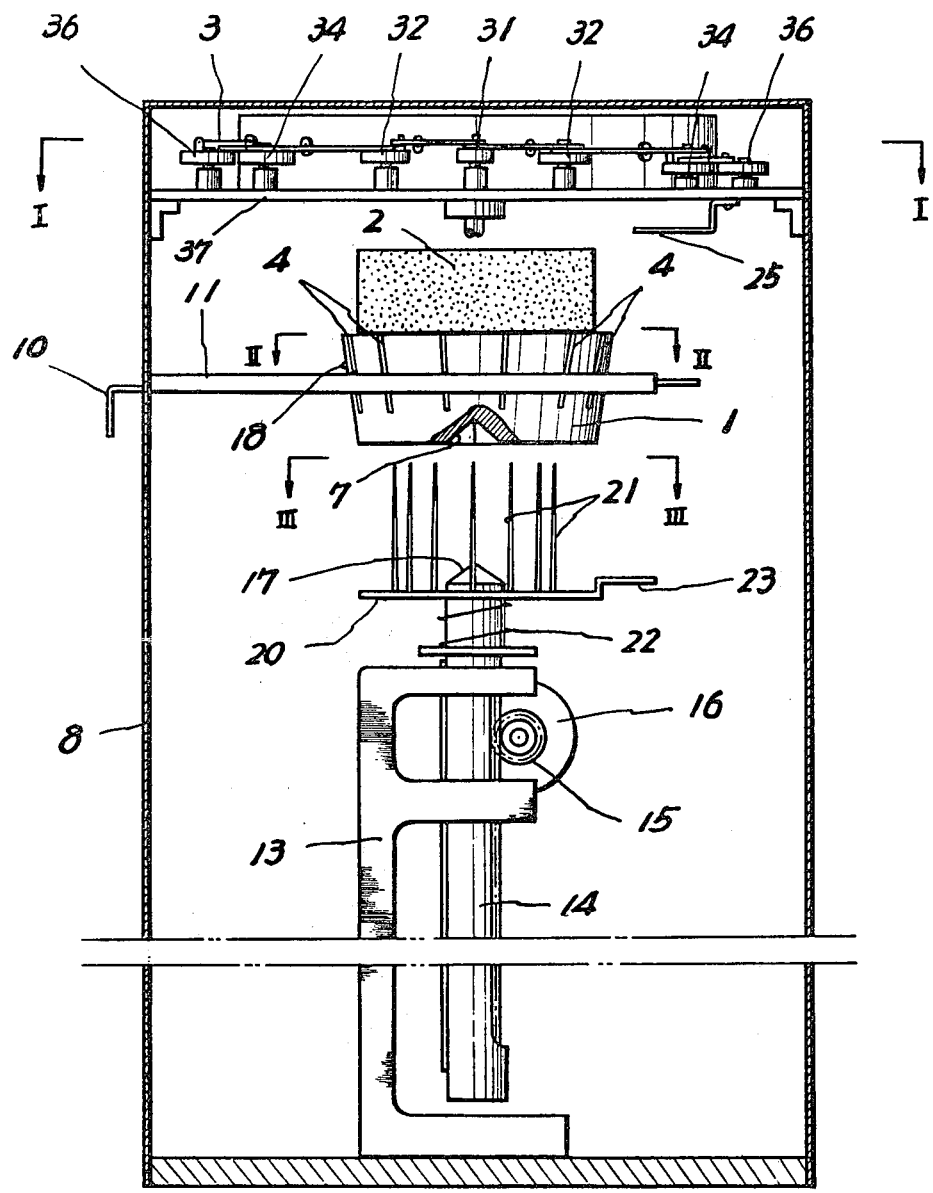
Figure 2:
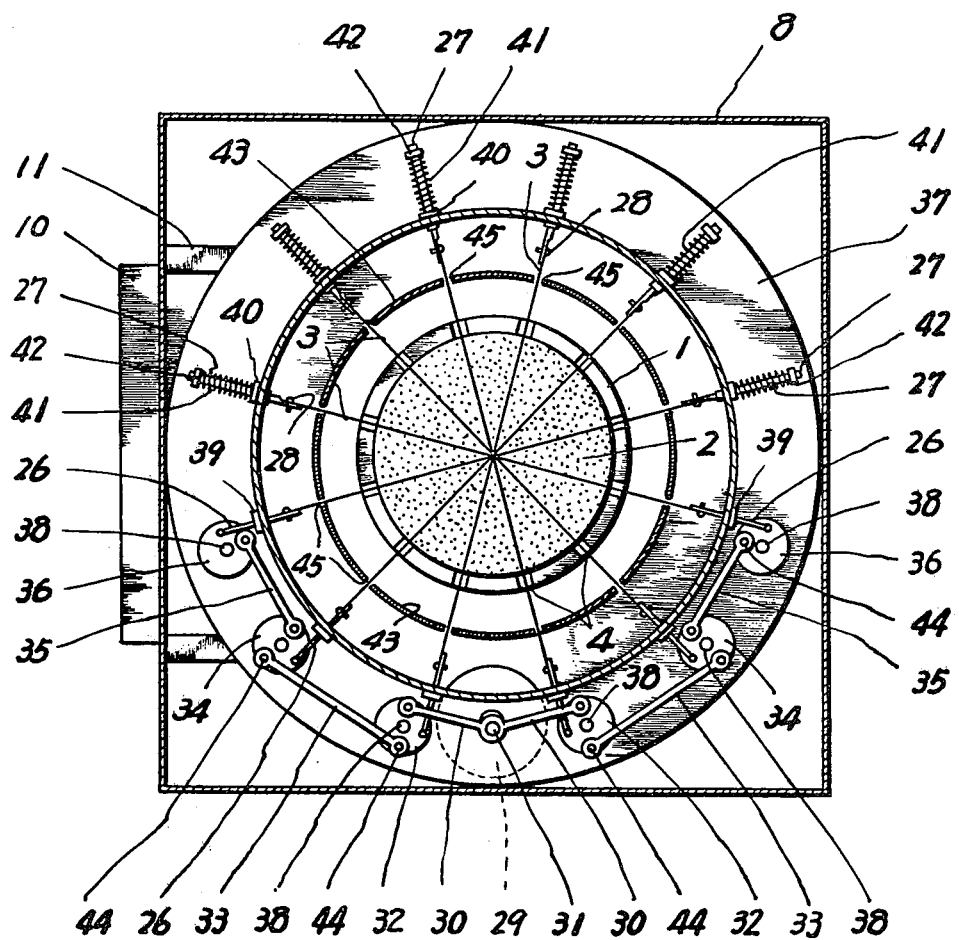
FIG. 2 is a sectional view taken on line I—I of FIG. 1.

As illustrated in FIG. 1, a table 1 is formed in the general shape of an inverted frustum of a cone to support a circular piece of cake 2 placed on the upper surface of the table. As illustrated in FIG. 2, a series of cutting bands 3 are radially arranged to intersect the center line of table 1 in successive vertical levels and displace from each other at equal horizontal angles, these bands being connected at their respective opposite ends to a series of reciprocatorily mounted supports 26 and 27. Power for operating the cutting bands 3 is provided by a motor 29 through a system of cranks and levers connected to the supports 26.

The primary coupling means for changing the rotary motion of the motor 29 to a reciprocating motion comprises a lever 30 centrally connected to a pin 31, which is eccentrically mounted on the motor shaft, the two ends of the lever 30 being connected to a first pair of crank discs 32. A second pair of coupling arms 33, connected by pins 44 to the first pair of discs 32, transmits that motion to a second pair of discs 34. A third pair of coupling arms 35 also transmits said motion to a third pair of discs 36. The discs 32, 34 and 36 are all pivotally mounted on a frame 37 by means of pivot pins 38 and are also pivotally connected with said support members 26 so as to reciprocate the supports and the cutting bands 3 within the guides 39 which are fixed in the frame 37. Furthermore, the support members 27 provided at the other ends of the cutting bands are slidably reciprocated within the guide members 40, also mounted on the frame 37. Each of the support members 27 is also encircled by a compression spring 41 confined between the guide member 40 and an adjusting nut 42 screwed on at the other end of the member 27. Further, guide grooves 45, for preventing twisting of the cutting bands 3 are provided in the cylindrical frame 43.

Figure 3:
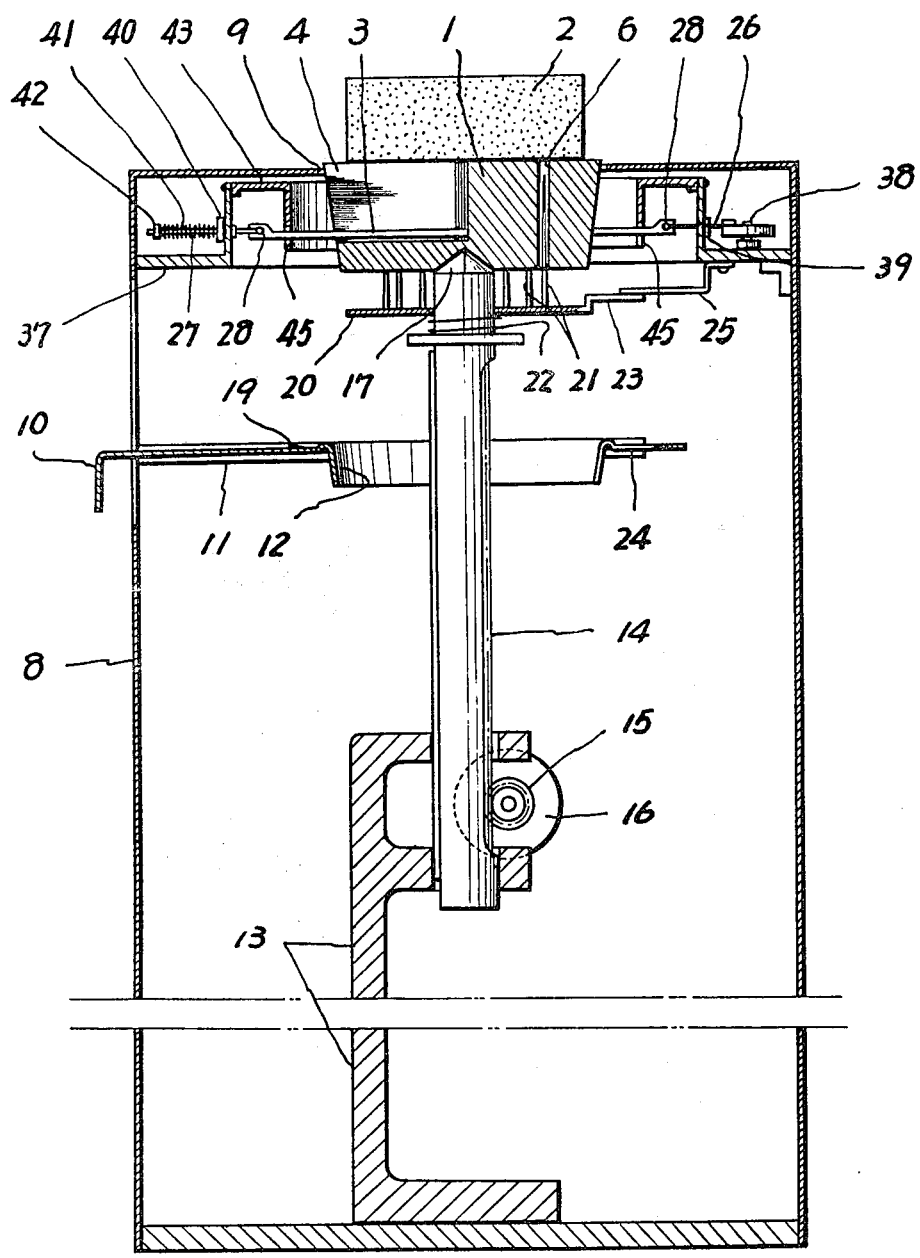
FIG. 3 is a vertical, sectional view.
Figure 4:
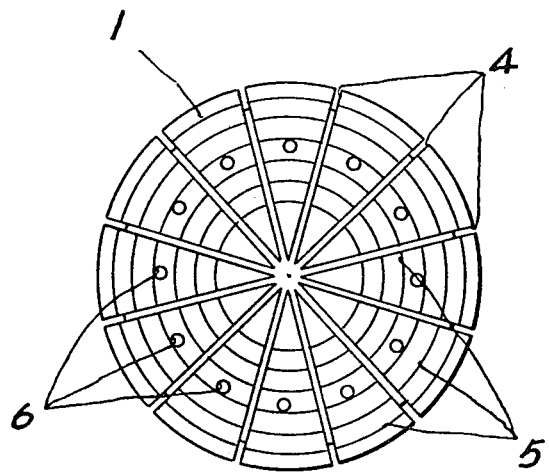
FIG. 4 is a plan view of the cake support taken on line II—II of FIG. 1.

As can be seen in FIGS. 3 and 4, a plurality of radial grooves 4 are provided in the table 1, into which the cutting bands 3 sink as the table is raised, as will be explained, and annular concentric lines 5 are provided in the upper surface of the table 1 to serve for setting the cake 2 in place concentrically with respect to the central intersection of the cutting bands. Also, a series of passages 6 extend vertically through each of the divided parts of the table 1 in parallel with the axis of the table and the underside of the table is provided with a centrally disposed pyramidally-shaped recess 7, as shown in FIG. 1.

As illustrated in FIG. 3, all of the foregoing elements, mounted on frame 37, are enclosed within a casing 8 and a circular opening 9 formed in the upper surface of the casing 8 is disposed in alignment with the cutting bands which are placed below this opening.

A slide 10 is removably mounted at an intermediate level of said casing 8 and carried by guide rails 11, an opening 12 for initially supporting the table 1 being formed in the slide 10 which can be pulled in and out of the casing.

A bearing pedestal 13 is supported at the bottom of the casing 8 and rack 14 is vertically, slidably carried on the upper end of said bearing pedestal 13 on an axis concentric with that of the table 1. The rack 14 is moved up and down by means of a pinion 15 which is rotated by a motor 16. Also, the upper end of the rack 14 is provided with a pyramidal surface 17 which is adapted to mate with the similar recess 7 in the bottom of table 1. The table 1 is lifted from the slide 10 and moved toward the cutting bands 3 by elevating the rack 14 so that after the cake is cut, the cutting bands 3 sink into the grooves 4 of the table. The angular positioning of the table 1 with respect to the cutting bands 3 is accomplished by engagement of the pyramidal surface 17 with the hollow pyramidal recess 7 after setting a mark 18 on the table in alignment with a mark 19 on the slide 10.

A series of lances 21 for piercing and holding the cake 2 in place by penetration through the openings 6 in the table, are supported on the upper surface of a plate 20 which is axially slidably mounted on the upper end of rack 14 in association with a spring 22. A projection 23 extends from the side of said plate 20, and a keyhole 24 is provided in the slide 10 to allow the projection 23 to pass upwardly through the plate until it comes into contact with a stop 25 mounted on casing 8 for sensing the motion of the projection 23 so as to prevent the projecting of the lances 21 from passing above the level of the opening 9, as illustrated in FIG. 3. In other words, the lances 21 must be withdrawn into the table 1 to allow the cake to be removed from the table by means of a scoop or the like after it has been cut.

Figure 5:
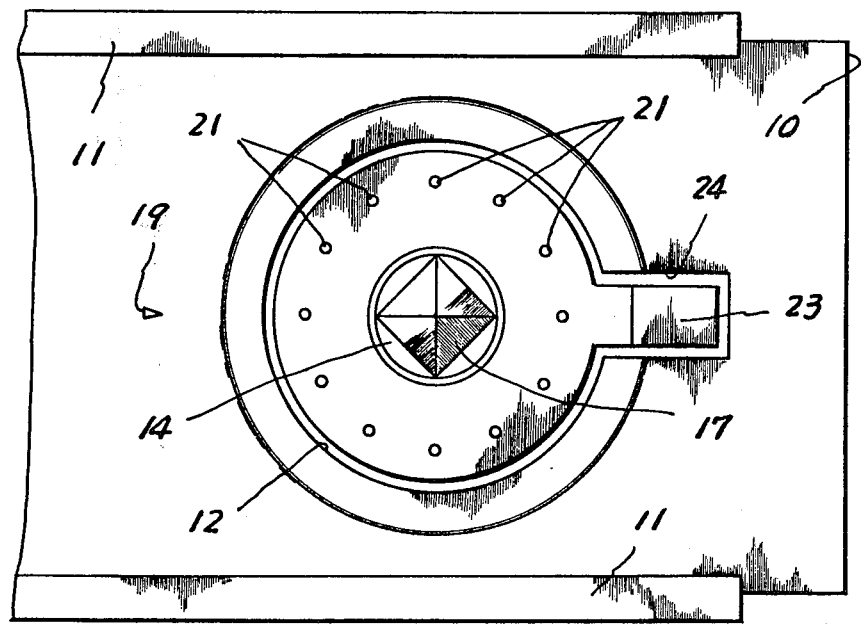
FIG. 5 is a view taken on line III—III of FIG. 1, but which also includes a plan view of the slide mechanism 10 and 11.

Then, as illustrated in FIG. 1, the table is replaced in the opening 12 of the slide 10 with the marks 18 and 19 (see FIGS. 1 and 5) in alignment with each other. The slide 10 is then replaced with the table to allow putting the circular cake in place on the table guided by the appropriate one of the annualar lines 5. Thereafter, the pinion 15, rotated by the motor 16, elevates the rack 14 and the pyramidal member 17 at the upper end of the rack 14 engages with a recess 17 of the table 1 to move the table toward the cutting bands 3.

Turning to FIG. 2, when the motor 29 is energized, the pin 31 connected with the motor is eccentrically rotated, and the reciprocating motion is transmitted to the first disc 32 through the first levers 30. From there, the reciprocating motion is transmitted to the second discs 34 and to the third discs 36, through the second levers 33 and the third levers 35. In this way, reciprocatory motion is transmitted respectively to each of the cutting bands 3 through the coupling members attached to the discs 32, 34 and 36.

When the table 1 is raised up toward the reciprocating bands 33, these cutting bands are each of them received into one of the grooves 4 of the table 1 after the cake 2 has been cut while concentrically resting on the table 1 whereby the cake is thus divided into separate segments of equal size. Then, the subdivided cake is elevated above the level of the opening 9 formed in the top of the casing 8 at which point, the cake can be removed from the table by means of a scoop or the like.

Thereafter, when the rack 14 is lowered again by the motor 16, the apparatus is restored to its former condition as illustrated in FIG. 1. The operation of the lances 21 is such that while the rack 14 is being moved up and the table is also rising with it, the lances 21, being also supported by the rack, are inserted through the passages 6 in the table 1 so as to pierce the cake 2 itself. On completing the cutting of the cake, the projection 23 of the plate 20 is engaged by the stop 25 so as to prevent the lances 21 from projecting above the upper surface of the table 1 at that point where the cake is to be removed from the table.

Also, the opening 12 is formed in the slide 10 to match the circumference of the table 1 so that the table can be smoothly raised and lowered from the slide 10 by means of the rack 14.

Moreover, it is within the scope of the present invention to provide switches for detecting the in and out movement of the drawer 10 and for detecting the up and down movement of the rack 14 by the driving motor 16 in either direction, so that the cutting of the cake could be automatically and easily performed.

Further, FIGS. 6 and 7 disclose another embodiment of the cutting mechanism, which includes only one of the cutting bands 103 disposed above a cake holding table 101 and being tensioned at one end by a spring member 141 which surrounds the support member 127, and which also includes a crank mechanism at the other end 130 connected with another support member 126 fixed on the other end of the cutting band 103 to transmit the driving power of a motor 129 so as to reciprocate the cutting band 103 to cut the cake 102 on the table 101, either by lowering of the cutting edge or by the raising up of the table 101.

As described above, since the present invention includes a table to support a cake on its upper surface, the table being provided with a set of grooves, a rack for moving the table upward or downward and a plurality of cutting devices disposed above the table and intersecting each other at equal angular intervals at superposed levels and each being held by a reciprocating support, with the cutting devices being arranged to fit into the grooves for the purpose of cutting the cake, the cake can be easily and accurately cut to divide it into a plurality of cakes of equal dimensions with only one motion. Also, since the present invention includes a spring member connected with the supporting member attached at one end of each of the cutting bands so as to tension the cutting bands with a crank device being connected with the other supporting member at the other end of each of the cutting bands to transmit the motor driving force for reciprocating the cutting bands, these bands can be reciprocated with a minute motion to speedily cut the cake without distorting its shape.

Still more, since the cutting bands are kept in a tensioned condition by the spring members, they can be smoothly reciprocated, without shock and also, the cutting bands will not come loose in their supports so as to cut the cake incorrectly.

Although the invention has been described in its preferred form with a certain degree of particularity, it is to be understood that the present disclosure of a preferred form of the invention may be changed in the details of construction and various combinations and arrangements of part may be resorted to without departing from the spirit and scope of the invention as hereinafter claimed.

What is claimed is:

1. Apparatus for cutting cake, or the like, comprising a framework, an assembly of horizontally elongated power actuated reciprocatory cutters mounted on said framework, a removable table having an upper surface for supporting a cake and having a series of downwardly directed grooves in said surface corresponding to the arrangement of said cutters to receive said assembly of cutters therein below the level of the supporting surface, slide means mounted on said framework for initially positioning said table with an uncut cake below said cutters, and elevating means to raise said table thus positioned by said slide means to cause a cake on said table to be cut into a plurality of pieces by said cutters, said table and elevating means including registering means to automatically position the table to permit said cutters to be received in said grooves to permit the cake to slide horizontally from the surface of the table after cutting, a series of vertically extending lances mounted on said framework for vertical movement, and means for moving said lances upwardly from an initial position below a table initially positioned by said slide means through a series of aligned openings in said table into the interior of a cake on said table and for further upward movement with said table when a cake is being cut, said means for moving said lances including stop means for limiting said upward movement of the lances to prevent projection of said lances above the level of the supporting surface of the table after a cake has been cut, said means for moving said lances also including a vertically reciprocable element supported by said framework for detachable engagement with the underside of said table for raising said table from said slide means for cutting a cake and for lowering the table to said slide means after a cake has been removed, said series of lances being mounted on said elements for movement with said element.

2. The invention defined in claim 1, wherein said registering means comprises an irregularly-shaped surface provided on said elevating means for coacting engagement with a complementary surface provided on said table.

3. The invention defined in claim 2, wherein said elevating means includes a vertical element having a pyramidally-shaped upper end, and said table is provided with a recess on the underside thereof to receive said upper end therein.

4. The invention defined in claim 1, wherein said means for mounting said lances includes a vertically-disposed rack mounted for vertical reciprocable displacement, a plate mounted on said rack for axial displacement with respect to the rack, and biasing means urging movement of said plate in an upward direction.

5. The invention defined in claim 1, wherein a medial portion of each of said reciprocatory cutters intersects a common vertical line passing through a central portion of said table for cutting said cake into pie-shaped segments.

6. The invention defined in claim 5, wherein said plate is provided with a plurality of radially spaced annular markings concentric with the axis of said vertical line.

7. Apparatus for cutting cake or the like, comprising a plurality of elongated cutter bands, a cutter band supporting framework means for supporting said cutter bands for horizontal reciprocatory movement, means for imparting said reciprocatory movement comprising a motor having a vertically positioned rotating shaft, an eccentric pin mounted on said shaft connected with a first lever arm, one end of each of said cutter bands being connected with an element mounted for oscillation about a vertical axis, said elements mounted for oscillation being joined to each other by second lever arms to transmit motion between said elements, said first lever arm being pivotally connected to at least one of said elements to impart said oscillation thereto, a table to support a cake during cutting, a series of lances to project upwardly into said cake through said table to prevent displacement of a cake during cutting, and means to initially support said table below said cutter bands and said lances below said table and for elevating said lances into said cake and said cake into engagement with said cutter bands and for withdrawing said lances from said cake when the cutting is completed.

8. The invention defined in claim 7, wherein said cutter bands are arranged to intersect a common vertical line to cut said cake into pie-shaped segments.

* * * * *